(12) United States Patent
Yang et al.

(10) Patent No.: US 11,835,029 B2
(45) Date of Patent: Dec. 5, 2023

(54) TOWER CLEARANCE MONITORING SYSTEM AND METHOD THEREFOR

(71) Applicant: BEIJING GOLDWIND SCIENCE & CREATION WINDPOWER EQUIPMENT CO., LTD., Beijing (CN)

(72) Inventors: Boyu Yang, Beijing (CN); Hongyu Gao, Beijing (CN); Xinle Li, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 644 days.

(21) Appl. No.: 16/971,941

(22) PCT Filed: Sep. 16, 2019

(86) PCT No.: PCT/CN2019/105947
§ 371 (c)(1),
(2) Date: Aug. 21, 2020

(87) PCT Pub. No.: WO2020/108016
PCT Pub. Date: Jun. 4, 2020

(65) Prior Publication Data
US 2021/0088030 A1 Mar. 25, 2021

(30) Foreign Application Priority Data
Nov. 30, 2018 (CN) .......................... 201811454598.6

(51) Int. Cl.
F03D 17/00 (2016.01)
G06T 7/70 (2017.01)
(Continued)

(52) U.S. Cl.
CPC ................ *F03D 17/00* (2016.05); *F03D 7/00* (2013.01); *G06T 7/0002* (2013.01); *G06T 7/70* (2017.01); *H04N 23/54* (2023.01)

(58) Field of Classification Search
CPC ......... F03D 17/00; F03D 7/00; G06T 7/0002; G06T 7/70; H04N 23/54; F05B 2260/80; F05B 2270/33; F05B 2270/8041
See application file for complete search history.

(56) References Cited

U.S. PATENT DOCUMENTS 7,246,991 B2   7/2007 Bosche
2006/0000269 A1* 1/2006 LeMieux ................ F03D 17/00
73/170.01
(Continued)

FOREIGN PATENT DOCUMENTS

CN    102141004 A    8/2011
CN    104838135 A    8/2015
(Continued)

OTHER PUBLICATIONS

Lihan He, et al; "Camera-Based Portable System for Wind Turbine Blade Tip Clearance Measurement", 2013 IEEE International Conference on Imaging Systems and Technique (IST); Oct. 1, 2013; pp. 451-456; XP055364904.
(Continued)

*Primary Examiner* — Matthew T Largi

(57) ABSTRACT

A tower clearance real-time monitoring system (100) and a method therefor. The tower clearance monitoring system (100) comprises an image capture device (101), a blade position processing device (102) and a core algorithm processing device (103). The image capture device (101) is used to capture an image of a wind turbine in an operating state, and the image comprises a blade portion and a tower portion; The blade position processing device (102) is used to determine whether the captured image represents valid data (Continued)

so as to send valid data to the core algorithm processing device (103). The core algorithm processing device (103) is used to use valid data to calculate a tower clearance value for a blade, and to send a calculation result to a wind turbine main control system (104) of a wind turbine.

15 Claims, 3 Drawing Sheets

(51) Int. Cl.
*F03D 7/00* (2006.01)
*G06T 7/00* (2017.01)
*H04N 23/54* (2023.01)

(56) References Cited

U.S. PATENT DOCUMENTS

| | | | | |
|---|---|---|---|---|
| 2010/0084864 | A1* | 4/2010 | Lucks | F03D 7/0288 290/44 |
| 2011/0135466 | A1* | 6/2011 | Latorre | F03D 17/00 416/61 |
| 2013/0287567 | A1 | 10/2013 | Olesen et al. | |
| 2014/0343740 | A1* | 11/2014 | Eriksen | F03D 7/047 700/287 |
| 2015/0322925 | A1* | 11/2015 | Klitgaard | F03D 17/00 416/61 |
| 2018/0003159 | A1* | 1/2018 | Bunge | G06T 7/0004 |
| 2020/0309092 | A1* | 10/2020 | Bertolotti | F03D 1/0633 |

FOREIGN PATENT DOCUMENTS

| | | |
|---|---|---|
| CN | 104865269 A | 8/2015 |
| CN | 107587983 A | 1/2018 |
| CN | 207195098 A | 4/2018 |
| EP | 2345943 A1 | 7/2011 |
| EP | 2635806 | 1/2012 |
| JP | 2010229824 A | 10/2010 |
| WO | 2019/110624 A1 | 6/2019 |

OTHER PUBLICATIONS

First Australian Office Action dated Apr. 19, 2021; Appln. 2019390444.
Extended European Search dated Mar. 23, 2021; Appln, No. 19890253.8.
The International Search Report dated Dec. 19, 2019; PCT/CN2019/105947.

* cited by examiner

TOWER CLEARANCE MONITORING SYSTEM AND METHOD THEREFOR

CROSS-REFERENCE TO RELATED APPLICATIONS

The present application is the US national phase of International Application No. PCT/CN2019/105947, titled "TOWER CLEARANCE MONITORING SYSTEM AND METHOD THEREOF", filed on Sep. 16, 2019, which claims priority to Chinese Patent Application No. 201811454598.6, titled "SYSTEM AND METHOD FOR MONITORING TOWER CLEARANCE IN REAL TIME", filed on Nov. 30, 2018, with the China National Intellectual Property Administration, both of which are incorporated herein by reference in their entirety.

FIELD

The present disclosure relates to the technical field of wind power generation, and in particular to a system for monitoring a tower clearance in real time and a method thereof.

BACKGROUND

For a wind turbine, a blade is required to be replaced if the blade strikes a tower. A single blade costs 700,000 yuan. Further, the wind turbine is shut down when replacing the blade. If the wind turbine is shut down for 20 days and a loss in power generation is more than 10,000 yuan per day, a loss in power generation is about 200,000 yuan for blade replacement, and a total loss may be 900,000 yuan. Therefore, it is required to monitor a tower clearance of the wind turbine, so as to avoid a loss caused by the blade striking the tower.

In an existing method for monitoring a tower clearance, a distance sensor is generally mounted on the blade. However, the distance sensor being mounted on the blade may affect aerodynamic performance of the blade, consequently affecting power generation performance of the wind turbine. Further, the existing method is not suitable for popularization due to high cost of the sensor. Therefore, it is required to develop a new method for monitoring the tower clearance.

SUMMARY

A tower clearance monitoring system and a method thereof are provided according to exemplary embodiments of the present disclosure, to solve at least the above technical problems and other technical problems not mentioned above and provide the following beneficial effects.

A tower clearance monitoring system is provided according to an aspect of the present disclosure. The tower clearance monitoring system may include an image capturing device, a blade position processing device and a core algorithm processing device. The image capturing device is configured to capture an image of a blade of a wind turbine during operation. The image includes a blade part and a tower part. The blade position processing device is configured to determine whether the captured image is valid data, and transmit the valid data to the core algorithm processing device. The core algorithm processing device is configured to calculate a tower clearance value for the blade based on the valid data, and transmit a calculation result to a main control system of the wind turbine.

The image capturing device may be mounted at a bottom of a nacelle or a top of a tower of the wind turbine.

The blade position processing device may include a first data processing unit, which is configured to monitor a sensitive region for a tip of the blade, to determine whether the tip of the blade is in the sensitive region.

The blade position processing device may further include a first data transmitting unit. In a case that the tip of the blade is in the sensitive region, the first data processing unit determines a currently captured image as the valid data and transmits the valid data to the core algorithm processing device via the first data transmitting unit. In a case that the tip of the blade is not in the sensitive region, the first data processing unit determines the currently captured image as invalid data.

The first data processing unit may further be configured to convert the captured image into an image in an HSV format, and determine, based on the format-converted image, whether the tip of the blade is in the sensitive region by using an inter-frame difference method.

The image capturing device may be integrated with the blade position processing device. The core algorithm processing device may be mounted independently.

The core algorithm processing device may include a second data transmitting unit. The image capturing device, the first data transmitting unit and the second data transmitting unit may perform data communication via an internal bus.

The second data transmitting unit may transmit the calculation result to the main control system of the wind turbine in real time via RS485 or a network cable interface based on a fieldbus protocol.

The core algorithm processing device may further include a selecting unit, which is configured to transmit current state information of the core algorithm processing device to the main control system of the wind turbine via the second data transmitting unit in a case that the core algorithm processing device fails to acquire the valid data, for the main control system of the wind turbine to change a current control strategy.

A method for calculating a tower clearance value by a tower clearance monitoring system is provided according to another aspect of the present disclosure. The method may include: capturing an image of a blade of a wind turbine during operation; determining whether the captured image is valid data; and calculating, in a case that the captured image is determined as valid data, a tower clearance value for the blade based on the valid data, and transmitting a calculation result to a main control system of the wind turbine.

The determining whether the captured image is valid data may include: monitoring a sensitive region for a tip of the blade, to determine whether the tip of the blade is in the sensitive region; determining the currently captured image as the valid data in a case that the tip of the blade is in the sensitive region; and determining the currently captured image as invalid data in a case that the tip of the blade is not in the sensitive region.

The monitoring a sensitive region for a tip of the blade may include: converting the captured image into an image in an HSV format, and determining, based on the format-converted image, whether the tip of the blade is in the sensitive region by using an inter-frame difference method.

The captured image may be transmitted to a blade position processing device of the tower clearance monitoring system via an internal bus. The valid data may be transmitted to a core algorithm processing device of the tower clearance monitoring system via the internal bus.

The calculation result may be transmitted from a core algorithm processing device of the tower clearance monitoring system to the main control system of the wind turbine via RS485 or a network cable interface based on a fieldbus protocol.

Based on the above-described tower clearance monitoring system and the method thereof, a tower clearance monitoring system based on an image capturing device is established. The system can monitor the tower clearance in real time based on appropriate design of the blade position processing device and the core algorithm processing device. Further, based on an appropriate mounting position, secure operation of the wind turbine can be ensured without affecting output performance of the wind turbine.

BRIEF DESCRIPTION OF THE DRAWINGS

The present disclosure is described in detail below with reference to the accompanying drawings. The above features and other objects, features, and advantages of the present disclosure may become clearer. In the drawings.

DETAILED DESCRIPTION OF EMBODIMENTS

Figure 1:
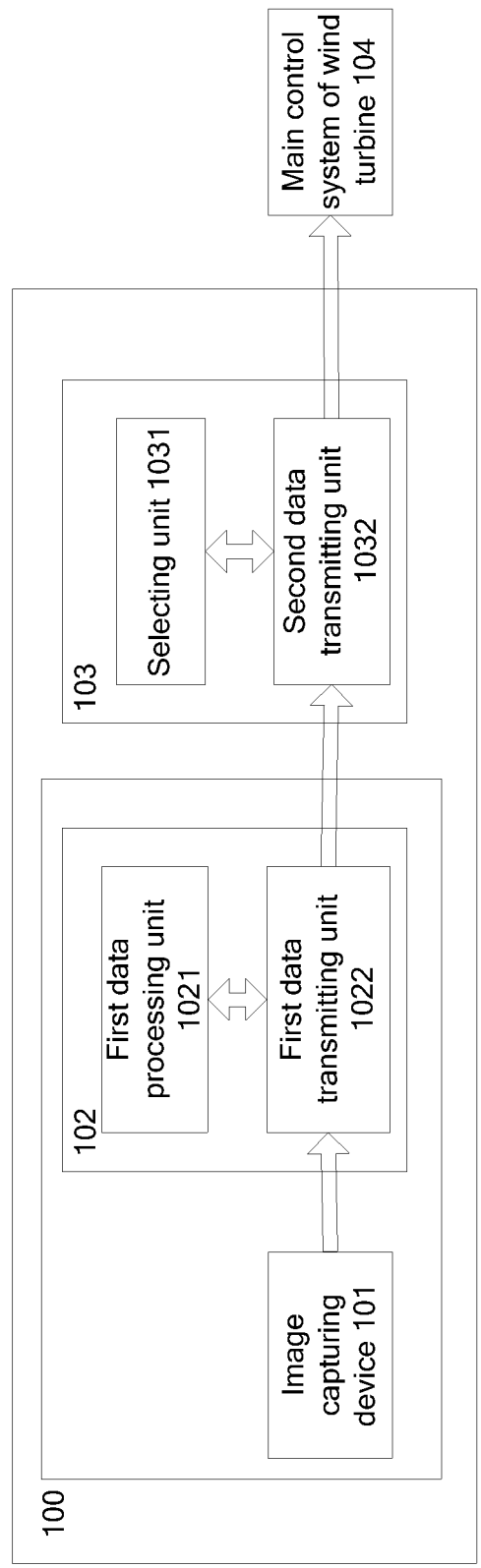
FIG. 1 is a block diagram of a tower clearance monitoring system according to an exemplary embodiment of the present disclosure.

Reference is made in detail to exemplary embodiments of the present disclosure. Examples of the embodiments are shown in the drawings, where the same reference numbers always indicate the same components. The embodiments are described below with reference to the drawings, so as to explain the present disclosure. It is apparent that the described embodiments are only some embodiments rather than all embodiments of the present disclosure. All other embodiments obtained by those skilled in the art based on the embodiments of the present disclosure without any creative work fall within the protection scope of the present disclosure.

In the present disclosure, terms including ordinal numbers such as "first", "second" and the like may be used to describe various elements. However, these elements should not be understood as being limited by these terms. These terms are only used to distinguish one element from other elements. For example, a first element may be referred to as a second element or vice versa without departing from the scope of the present disclosure.

FIG. 1 is a block diagram of a tower clearance monitoring system according to an exemplary embodiment of the present disclosure.

Referring to FIG. 1, a tower clearance monitoring system 100 according to the present disclosure may include an image capturing device 101, a blade position processing device 102 and a core algorithm processing device 103. The blade position processing device 102 may include a first data processing unit 1021 and a first data transmitting unit 1022. The first data processing unit 1021 may determine whether an image captured by the image capturing device 101 is valid data, so as to transmit the valid data to the core algorithm processing device 103. The first data transmitting unit 1022 may perform data communication with units or devices such as the first data processing unit 1021, the image capturing device 101, and the core algorithm processing device 103. The core algorithm processing device 103 may include a selecting unit 1031 and a second data transmitting unit 1032. The second data transmitting unit 1032 may perform data communication with units or devices such as the first data transmitting unit 1022, a main control system of the wind turbine, and the selecting unit 1031.

Figure 2:
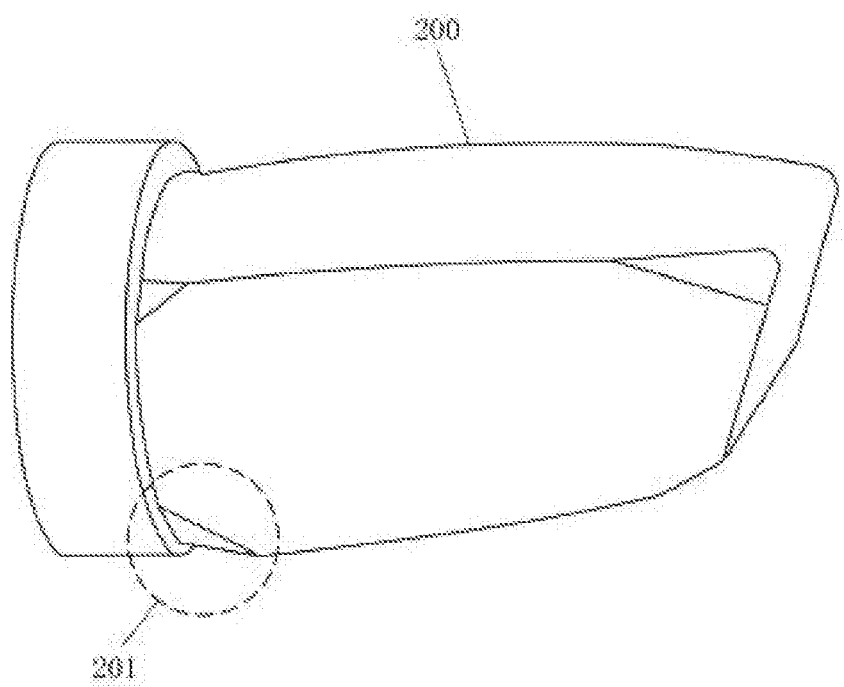
FIG. 2 is a diagram showing a mounting position of the tower clearance monitoring system according to an exemplary embodiment of the present disclosure.

In order to acquire an appropriate image showing a distance between a blade and a tower, a mounting position of the image capturing device 101 is required to meet the following conditions. First, the tower clearance monitoring system is required to be relatively fixed to a position of a nacelle of the wind turbine, so as to stably acquire an image showing a distance between a tip of the blade and the tower. Second, since the wind turbine is usually in a harsh environment, the mounting position of the tower clearance monitoring system is required to prevent rain and snow from attaching to a lens of the image capturing device. Third, the tower clearance monitoring system is required to head-on or sideways face the distance between the tip of the blade and the tower. In order to meet the above conditions, the tower clearance monitoring system is required to be mounted at a bottom of the nacelle of the wind turbine, as shown in FIG. 2. A dotted circle 201 in FIG. 2 exemplarily shows a mounting position of the image capturing device in a nacelle 200 of the wind turbine.

Alternatively, the image capturing device 101 may also be mounted on a top of the tower of the wind turbine, so as to better capture the image of the blade during operation, while avoiding an impact on aerodynamic performance of the blade that affects output performance of the wind turbine. The captured image includes a blade part and a tower part, so as to calculate the tower clearance value later.

In the tower clearance monitoring system 100, the image capturing device 101 may be integrated with the blade position processing device 102. Since output power of the core algorithm processing device 103 is large, the core algorithm processing device may be independently mounted for heat dissipation. Alternatively, the image capturing device 101 and the blade position processing device 102 may be mounted separately. The blade position processing device 102 and the core algorithm processing device 103 may be mounted inside the nacelle. However, the present disclosure is not limited thereto.

The image capturing device 101 may capture an image of a blade of the wind turbine during operation. According to an embodiment of the present disclosure, the image capturing device 101 is required to meet the following conditions so as to acquire an image that meets requirements. First, a length of the blade of the wind turbine generally exceeds 60 meters. In order to accurately measure the tower clearance 60 meters away, a focal length of the image capturing device is required to exceed 20 mm. Second, a speed of the tip of the blade exceeds 80 m/s when the wind turbine is in full-power generation, and the tip of the blade exists in the field of view of the image capturing device for about 300 ms. In order to ensure that the image capturing device captures an image of the blade within 300 ms, a frame rate of the image capturing device is required to exceed 20 Hz. Third, since the tower clearance monitoring system is required to perform monitoring in real time at night, the image capturing device is required to have a night vision function, and an irradiation distance of an infrared fill light of the image capturing device is required to reach 200 meters. For example, the image capturing device 101 may be a camera that meets the above conditions.

In order to monitor the tower clearance of the wind turbine in real time, time consumption of an overall system in communication transmission is required to be reduced as much as possible. Therefore, the image capturing device 101 is required to transmit data to the blade position processing device 102 in a wired manner. For example, the image capturing device 101 may transmit the captured image to the first data processing unit 1021 via the first data transmitting unit 1022 and an internal bus. Communication being performed via the internal bus reduces time spent by the overall system in data transmission.

The blade position processing device 102 may determine whether the captured image is valid data. For example, the blade position processing device 102 may be implemented by a chip. Since the tower clearance monitoring system is required to output the tower clearance value for the blade in real time, an image used for calculating the tower clearance value for the blade may be generated only when the blade is in the field of view of the image capturing device. If core algorithm processing is performed on each frame of the captured image, calculation resources of the tower clearance monitoring system may be excessively occupied, and an operating speed of the tower clearance monitoring system may be reduced. Consequently, real-time performance for calculating the clearance value cannot be ensued, and a service life of the tower clearance monitoring system may be drastically shortened. In order to ensure processing performance of the tower clearance monitoring system and ensure that the tower clearance monitoring system can be used stably for more than 5 years, the first data processing unit 1021 of the blade position processing device 102 may determine whether the captured image is valid data. In a case that the captured image is valid data, the first data processing unit 1021 transmits the valid data to the core algorithm processing device 103 via the first data transmitting unit 1022. In a case that the captured image is not valid data, the first data processing unit 1021 does not transmit the captured image to the core algorithm processing device 103.

According to an embodiment of the present disclosure, in the process of determining whether the captured image is valid data, a sensitive region may be first set and is monitored in real time. In a case that the tip of the blade is in the sensitive region, the first data processing unit 1021 determines the currently captured image as valid data. In a case that the tip of the blade is not in the sensitive region, the first data processing unit 1021 determines the currently captured image as invalid data.

Specifically, first, the first data processing unit 1021 converts the captured image into an image in an HSV format, that is, performs HSV processing on the captured image. HSV is a relatively intuitive color model. Parameters of a color in this model include hue (H), saturation (S), and value (V). The hue (H) is measured in angle ranging from 0° to 360°, and is calculated counterclockwise from red. The hue of red is set to be 0°, the hue of green is set to be 120°, and the hue of blue is set to be 240°. Complementary colors of red, green and blue are yellow with hue of 60°, cyan with hue of 180° and magenta with hue of 300°, respectively. The saturation (S) indicates a degree to which a color is close to a spectral color, and is expressed by a value generally ranging from 0% to 100%. The higher the value is, the more saturated the color is. That is, the greater the proportion of the spectral color is, the closer the color is to the spectral color, and the higher the saturation of the color is. The higher the saturation is, the deeper and more gorgeous the color is. When a white light component in the spectral color is 0, the saturation reaches the maximum. Generally, a tip of a blade of a wind turbine is red and the overall blade is white. Therefore, the two colors of the blade may be regarded as a mixture of a spectral color and white. The value (V) indicates a degree of brightness of a color, and usually ranges from 0% (black) to 100% (white). The value of a color of a light source is related to brightness of a light emitter. The value of a color of an object is related to transmittance or reflectance of the object.

According to an embodiment of the present disclosure, first, the first data processing unit 1021 converts the acquired image from an RGB (Red, Green, and Blue) format into an HSV format. In a process of format conversion, R, G, and B values of each pixel in the image are converted into H, S, and V values.

The H value of each pixel may be calculated from equation (1):

$$H = \begin{cases} 0°, \Delta = 0 \\ 60° * \left(\frac{G' - B'}{\Delta} + 0\right), C_{max} = R' \\ 60° * \left(\frac{B' - R'}{\Delta} + 2\right), C_{max} = R' \\ 60° * \left(\frac{R - G}{\Delta} + 4\right), C_{max} = R' \end{cases} \quad (1)$$

where $R'=R/255$, $G'=G/255$, $B'=B/255$, $C_{max}=\max(R', G', B')$, $C_{min}=\min(R', G', B')$, and $\Delta=C_{max}-C_{min}$.

The S value of each pixel may be calculated from equation (2):

$$S = \begin{cases} 0, C \max = 0 \\ \frac{\Delta}{C \max}, C \max \neq 0 \end{cases} \quad (2)$$

where $R'=R/255$, $G'=G/255$, $B'=B/255$, $C_{max}=\max(R', G', B')$, $C_{min}=\min(R', G', B')$, and $\Delta=C_{max}-C_{min}$.

The V value of each pixel may be calculated from equation (3):

$$V = C_{max} \quad (3)$$

where $R'=R/255$, $G'=G/255$, $B'=B/255$, $C_{max}=\max(R', G', B')$.

Component images for H, S, and V may be obtained by calculating H, S, and V components of each pixel, and the image in the HSV format of the blade during operation is obtained by fusing the component images for H, S, and V.

After converting the captured image into the image in the HSV format, the first data processing unit 1021 determines, based on the format-converted image, whether the tip of the blade is in the sensitive region by using an inter-frame difference method. A position and a size of the sensitive region may be set based on experience of a designer.

A video sequence collected by the image capturing device 101 is continuous. In a case of no moving target in a shooting scene, a change between sequential frames is weak. In a case of a moving target in the shooting scene, the change between sequential frames is significant. Since the target in the shooting scene moves, positions of an image of the target are different in different image frames. Therefore, movement of the tip of the blade may be monitored by using the inter-frame difference method.

In the inter-frame difference method, a differential operation is performed on two or three image frames that are sequential in time. A pixel value of a pixel in one frame image is subtracted from a pixel value of a corresponding pixel in another frame image, so as to determine an absolute value of a grayscale difference. In a case that the absolute value exceeds a certain threshold, it is determined that there is a moving target in the shooting scene, thereby achieving the function of moving target monitoring.

For example, the movement of the tip of the blade may be monitored by using a two-frame difference method. An n-th frame and an (n−1)-th frame of the video sequence collected by the image capturing device 101 are recorded as $f_n$ and $f_{n-1}$, respectively. Grayscale values of pixels in the two image frames are recorded as $f_n(x, y)$ and $f_{n-1}(x, y)$, respectively. The grayscale values of the pixels in one of the two image frames are subtracted from the grayscale values of the pixels in the other of the two image frames based on the equation (4), and an absolute value of a difference between the grayscale values of the pixel in the two image frames is obtained, to obtain a differential image $D_n$.

$$D_n(x,y)=|f_n(x,y)-f_{n-1}(x,y)| \quad (4)$$

where x and y respectively represent a horizontal coordinate and a vertical coordinate of the pixel in the two image frames.

A threshold T is set, and binarization processing is performed on pixels in the differential image $D_n$ one by one based on an equation (5), to obtain a binary image $R_n'$.

$$R_n'(x, y) = \begin{cases} 255, & D_n(x, y) > T \\ 0, & \text{else} \end{cases} \quad (5)$$

where a pixel with a grayscale value of 255 is a foreground (the tip of the blade) point, a pixel with a grayscale value of 0 is a background point, and connectivity analysis is performed on the image $R_n'$ to finally obtain an image $R_n$ including the tip of the blade.

After the image $R_n$ is obtained, the first data processing unit 1021 determines whether the tip of the blade is in the sensitive region based on the set sensitive region. For example, the first data processing unit 1021 may determine whether the tip of the blade is in the sensitive region based on position coordinates of the tip of the blade and position coordinates of the set sensitive region in the image $R_n$.

According to an embodiment of the present disclosure, when the tip of the blade is in the sensitive region, a data processing trigger signal is generated, and an image captured at this time instant is transmitted to the core algorithm processing device 103 via the first data transmitting unit 1022 through the internal bus. The core algorithm processing device 103 calculates the tower clearance value for the blade based on this image. For example, the core algorithm processing device 103 may be implemented by a processing board.

After receiving a valid image (that is, the image $R_n$ in which the tip of the blade is in the sensitive region), the core algorithm processing device 103 identifies the tip of the blade and the tower, calculates a position of the tip of the blade and a linear function of an edge of the tower, then calculates a distance from a vertex of the tip of the blade to a straight line of the edge of the tower to obtain a pixel distance from the tip of the blade to the tower, and acquires an actual distance from the blade to the tower based on a length of the blade and the calculated pixel distance.

For example, the core algorithm processing device 103 may acquire the position coordinates of the tip of the blade by using a sub-pixel corner detection method, acquire the function of the edge of the tower by using a straight line detection method, and substitute the position coordinates of the vertex of the tip of the blade into the function of the edge of the tower to obtain the pixel distance from the tip of the blade to the tower.

The second data transmitting unit 1032 of the core algorithm processing device 103 transmits a calculation result to a main control system 104 of the wind turbine in real time via RS 485 or a network cable interface based on a fieldbus protocol. The main control system 104 of the wind turbine receives the calculation result and ensures the secure operation of the wind turbine in real time based on the received result.

The core algorithm processing device 103 may further include a selecting unit 1031. In a case of low visibility weather such as heavy fog, heavy rain or heavy snowfall, the image capturing device 101 fails to capture the valid image of the blade during operation. Consequently, the core algorithm processing device 103 fails to acquire valid data in a period of time. In this case, the selecting unit 1031 may transmit current state information of the core algorithm processing device 103 to the main control system 104 of the wind turbine via the second data transmitting unit, so that the main control system can change a current control strategy.

For example, the selecting unit 1031 may transmit the state information that the core algorithm processing device 103 fails to acquire the valid data to the main control system 104 via the second data transmitting unit 1032, to notify the main control system 104 that the current control strategy is required to be changed, thereby avoiding a case that the blade strikes the tower due to failure to acquire the tower clearance value.

Figure 3:
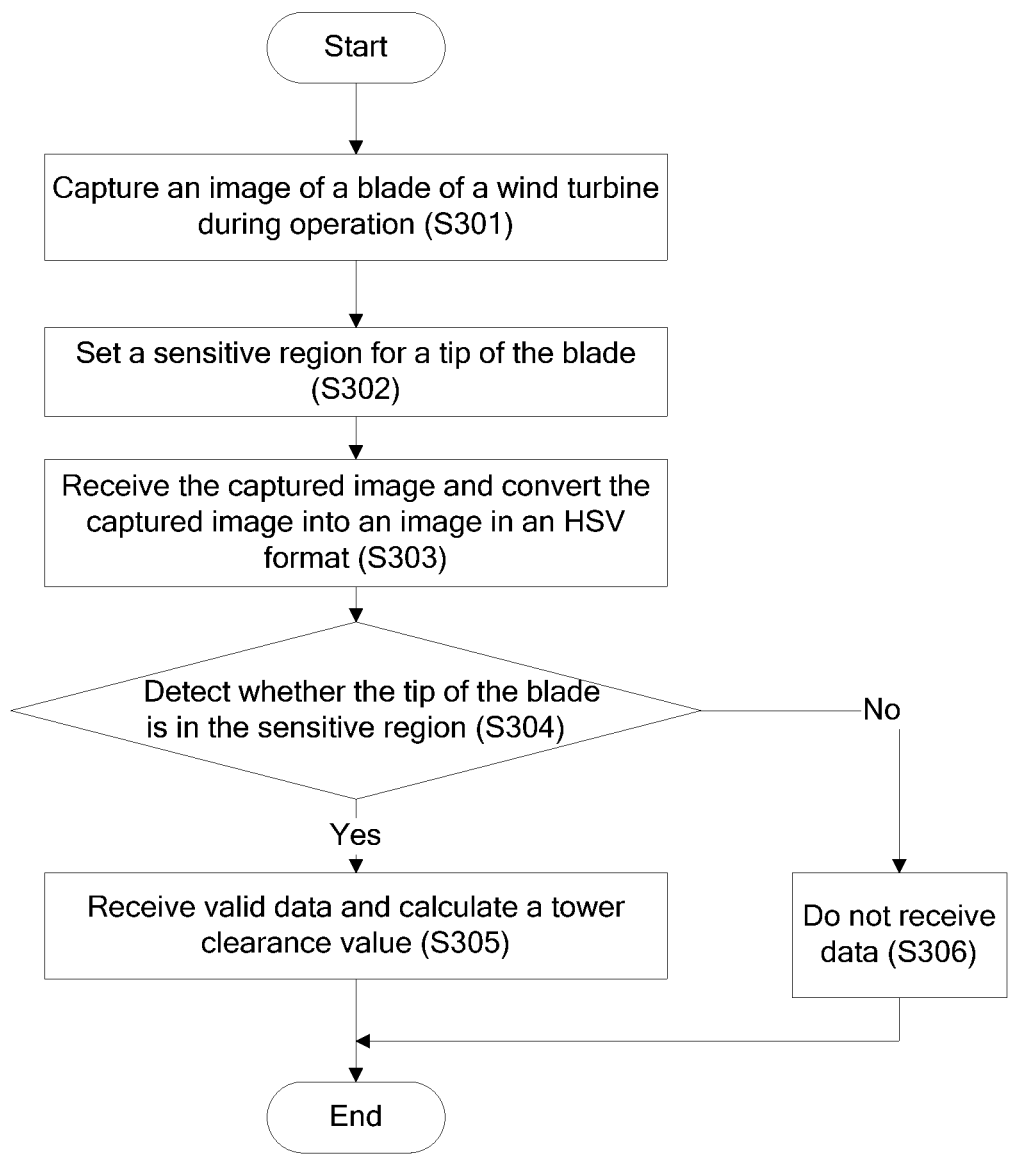
FIG. 3 is a flowchart of a method for calculating a tower clearance value according to an exemplary embodiment of the present disclosure.

FIG. 3 is a flowchart of a method for calculating a tower clearance value according to an exemplary embodiment of the present disclosure.

The tower clearance value may be calculated in real time by a tower clearance monitoring system 100. An image capturing device 101 of the tower clearance monitoring system 100 may be mounted at a bottom of a nacelle of the wind turbine, so as to perform video monitoring on the tower clearance, and ensure secure operation of the wind turbine. Alternatively, the image capturing device 101 may also be mounted on a top of the tower of the wind turbine, so as to capture an image including a blade part and a tower part of the blade during operation.

Referring to FIG. 3, in step S301, the image capturing device 101 captures an image of a blade of the wind turbine during operation. The image capturing device 101 according to the present disclosure may be a camera that has parameters of a focal length exceeding 20 mm, a frame rate exceeding 20 Hz and an irradiation distance of an infrared fill light reaching 200 meters and has a night vision function. The camera collects a video sequence in real time, to obtain the image of the blade of the wind turbine during operation.

In step S302, a sensitive region for the tip of the blade is set. For example, a position and a size of the sensitive region may be set based on work experience of a designer, so as to more accurately determine whether the captured image is valid.

In step S303, the image captured by the image capturing device 101 is received via a first data transmitting unit 1022 of a blade position processing device 102. A first data processing unit 1021 of the blade position processing device 102 converts the captured image into an image in an HSV format. First, the acquired image is converted from an RGB format into the HSV format. In a process of format conversion, R, G, and B values of each pixel in the image are converted to H, S, and V values.

The first data processing unit 1021 may calculate the H value of each pixel from the equation (1), calculate the S value of each pixel from the equation (2), and calculate the V value of each pixel from the equation (3). Component images for H, S, and V may be obtained by calculating H, S, and V components of each pixel. The image in the HSV format of the blade during operation is obtained by fusing the component images for H, S, and V.

In step S304, the first data processing unit 1021 determines, based on the format-converted image, whether the tip of the blade is in the sensitive region by using an inter-frame difference method.

For example, the first data processing unit 1021 may monitor movement of the tip of the blade by using a two-frame difference method. A differential image $D_n$ between two sequential image frames may be obtained from the equation (4). Then a threshold T is set. Binarization processing is performed on pixels in the differential image $D_n$ one by one based on the equation (5), to obtain a binary image $R_n'$. Connectivity analysis is performed on the image $R_n'$ to finally obtain an image $R_n$ including the tip of the blade.

After the image $R_n$ is obtained, the first data processing unit 1021 determines whether the tip of the blade is in the sensitive region based on the set sensitive region. For example, the first data processing unit 1021 may determine whether the tip of the blade is in the sensitive region based on position coordinates of the tip of the blade and position coordinates of the set sensitive region in the image.

In a case that the tip of the blade is in the sensitive region, the method proceeds to step S305. The valid data is received via a second data transmitting unit 1032 of a core algorithm processing device 103. The core algorithm processing device 103 calculates the tower clearance value for the blade based on the valid data. For example, the core algorithm processing device 103 may acquire, based on the valid data (that is, a valid image), the position coordinates of the tip of the blade by using a sub-pixel corner detection method, acquire a function of an edge of the tower by using a Hough transform straight line detection method, substitute the position coordinates of a vertex of the tip of the blade into the function of the edge of the tower to obtain a pixel distance from the tip of the blade to the tower, and acquire an actual distance from the blade to the tower based on a length of the blade and the calculated pixel distance, so as to obtain the tower clearance value for the blade. However, the present disclosure is not limited thereto. The core algorithm processing device 103 may calculate the tower clearance value by using other algorithms.

In a case that the tip of the blade is not in the sensitive region, the method proceeds to step S306. The first data processing unit 1021 determines the currently captured image as invalid data. In this way, the core algorithm processing device 103 performs core algorithm processing on only the valid image, not only increasing the operating speed of the overall system, improving efficiency in detecting the clearance value and ensuring real-time performance, but also increasing the service life of the system.

After the tower clearance value is calculated, a calculation result is transmitted to a main control system 104 of the wind turbine via a second data transmitting unit 1032 of the core algorithm processing device 103, so that the main control system 104 can detect deformation of the blade in real time based on the calculation result.

In a case of low visibility weather such as heavy fog, heavy rain or heavy snowfall, the image capturing device 101 fails to capture the valid image of the blade during operation. Consequently, the core algorithm processing device 103 fails to acquire valid data in a period of time. In this case, the selecting unit 1031 of the core algorithm processing device 103 may transmit current state information indicating that the core algorithm processing device 103 fails to acquire the valid data to the main control system 104 via the second data transmitting unit 1032, so as to notify the main control system 104 that a current control strategy is required to be changed, thereby avoiding a case that the blade strikes the tower due to failure to acquire the tower clearance value.

Although the present disclosure is specifically shown and described with reference to exemplary embodiments of the present disclosure, those skilled in the art should understand that various changes in form and details may be made to the present disclosure without departing from the spirit and scope of the present disclosure as defined by the claims.

The invention claimed is:

1. A system for monitoring a tower clearance in real time, comprising an image capturing device, a blade position processing device and a core algorithm processing device, wherein
the image capturing device is configured to capture an image of a wind turbine during operation, wherein the image comprises a blade part and a tower part;
the blade position processing device is configured to determine whether the captured image is valid data, and transmit the valid data to the core algorithm processing device; and
the core algorithm processing device is configured to calculate a tower clearance value for a blade based on the valid data, and transmit a calculation result to a main controller of the wind turbine, whereby the main controller controls, according to the calculation result, the wind turbine to operate in a manner that prevents the blade from striking a tower of the wind turbine,
wherein the blade position processing device is further configured to monitor a sensitive region for a tip of the blade, to determine whether the tip of the blade is in the sensitive region,
wherein the blade position processing device converts the captured image into an image in an HSV format, and determines, based on the format-converted image, whether the tip of the blade is in the sensitive region by using an inter-frame difference method.

2. The system according to claim 1, wherein the image capturing device is mounted at a bottom of a nacelle or a top of a tower of the wind turbine.

3. The system according to claim 1, wherein the blade position processing device is further configured to:
determine a currently captured image as the valid data and transmit the valid data to the core algorithm processing device in a case that the tip of the blade is in the sensitive region; and
determine the currently captured image as invalid data in a case that the tip of the blade is not in the sensitive region.

4. The system according to claim 1, wherein the image capturing device is integrated with the blade position processing device, and the core algorithm processing device is mounted independently.

5. The system according to claim 1, wherein the core algorithm processing device transmits the calculation result to the main controller of the wind turbine in real time via RS485 or a network cable interface based on a fieldbus protocol.

6. The system according to claim 1, wherein the core algorithm processing device is further configured to transmit current state information of the core algorithm processing device to the main controller of the wind turbine in a case that the core algorithm processing device fails to acquire the valid data, for the main controller of the wind turbine to change a current control strategy.

7. The system according to claim 1, wherein the blade position processing device calculates H, S and V components of each pixel of the captured image to obtain component images for H, S and V, and fuses the component images for H, S and V to obtain the image in the HSV format.

8. The system according to claim 1, wherein the inter-frame defference method is a two-frame difference method, and the two-frame difference method comprises subtracting grayscale values of pixels in one of two image frames from grayscale values of pixels in the other of the two image frames, to obtain a differential image.

9. A method for calculating a tower clearance value in real time by a tower clearance monitoring system, the method comprising:
   capturing an image of a wind turbine during operation, wherein the image comprises a blade part and a tower part;
   determining whether the captured image is valid data; and
   calculating a tower clearance value for a blade based on the valid data, and transmitting a calculation result to a main controller of the wind turbine, in a case that the captured image is determined as valid data, whereby the main controller controls, according to the calculation result, the wind turbine to operate in a manner that prevents the blade from striking a tower of the wind turbine,
   wherein the determining whether the captured image is valid data comprises:
      montirong a sensitive region for a tip of the blade, to determine whether the tip of the blade is in the sensitive region,
   wherein the monitoring a sensitive region for a tip of the blade comprises:
      converting the captured image into an image in an HSV format, and determining, based on the format-converted image, whether the tip of the blade is in the sensitive region by using an inter-frame difference method.

10. The method according to claim 9, wherein the determining whether the captured image is valid data further comprises:
   determining the currently captured image as the valid data in a case that the tip of the blade is in the sensitive region; and
   determining the currently captured image as invalid data in a case that the tip of the blade is not in the sensitive region.

11. The method according to claim 9, further comprising:
   transmitting the captured image to a blade position processing device of the tower clearance monitoring system via an internal bus; and
   transmitting the valid data to a core algorithm processing device of the tower clearance monitoring system via the internal bus.

12. The method according to claim 9, further comprising:
   transmitting the calculation result from a core algorithm processing device of the tower clearance monitoring system to the main controller of the wind turbine via RS485 or a network cable interface based on a fieldbus protocol.

13. The method according to claim 9, further comprising:
   transmitting current state information of the tower clearance monitoring system to the main controll of the wind turbine in case of failure to acquire the valid data, for the main controller of the wind turbine to change a current control strategy.

14. The method according to 9, wherein the converting the captured image into an image in an HSV format comprises:
   calculationg H, S and V components of each pixel of the captured image to obtain component images for H, S and V, and fusing the component images for H, S and V to obtain the image in the HSV format.

15. The method according to claim 9, wherein the inter-frame difference method is a two-frame difference method, and the two-frame difference method comprises subtracting grayscale values of pixels in one of two image frames from grayscale values of pixels in the other of the two image frames, to obtain a differential image.

* * * * *